Figure 1A:
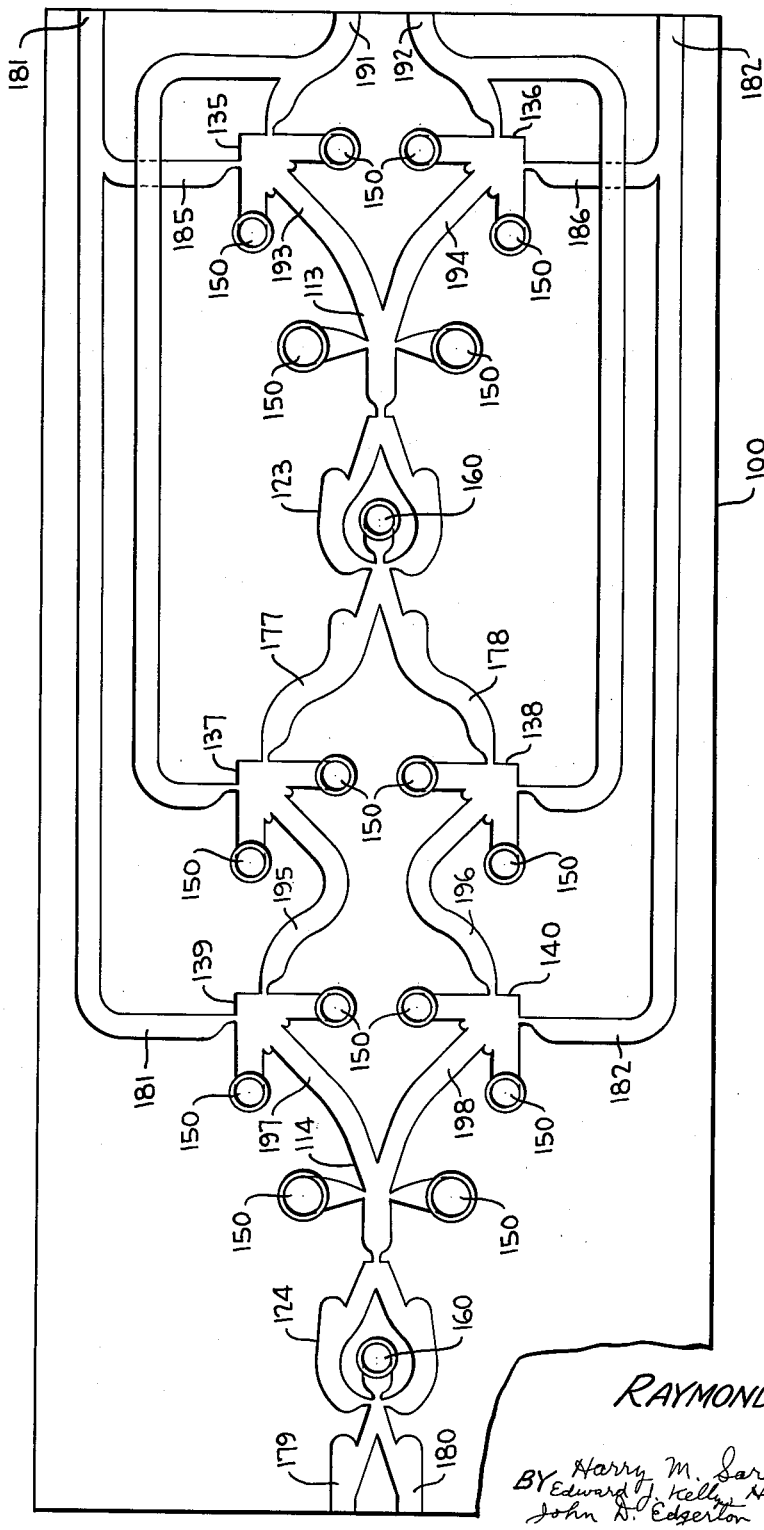

INVENTOR,
RAYMOND W. WARREN

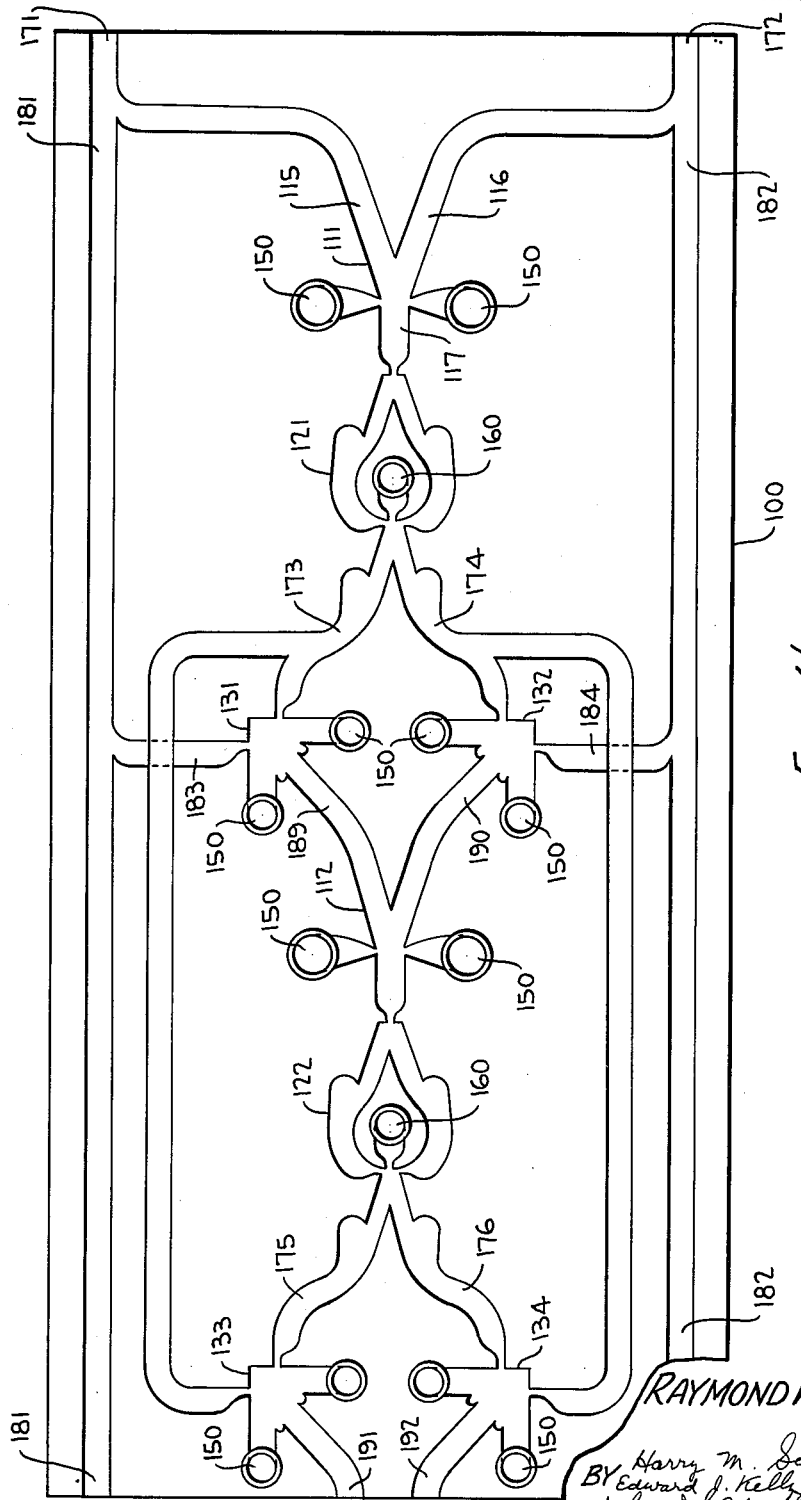

INVENTOR,
RAYMOND W. WARREN

United States Patent Office 3,224,674
Patented Dec. 21, 1965

3,224,674
HIGH-SPEED COUNTERS AND FLUID FORWARD-BACKWARD COUNTERS
Raymond W. Warren, McLean, Va., assignor to the United States of America as represented by the Secretary of the Army
Filed May 11, 1964, Ser. No. 366,668
4 Claims. (Cl. 235—201)
(Granted under Title 35, U.S. Code (1952), sec. 266)

The invention described herein may be manufactured and used by or for the Government of the United States of America for governmental purposes without the payment to me of any royalty thereon.

This invention relates generally to fluid systems, and more particularly to high-speed fluid counters and fluid forward-backward counters having applications in computation and control system.

An indispensable element in digital computer systems is the binary counter. A specialized version of the binary counter is the forward-backward counter which permits counting up or down on command. This type of counter has in the past found its principal application as a buffer in input output equipment of general purpose digital computers. More recently, it has been used as a primary element in real time digital computation and simulation systems. Typical of such digital systems are the pulse rate or binary rate systems.

The automatic control field conventionally uses analog techniques and systems to affect the control of physical processes. Today, many process control systems require more accurate precise control than permitted with the conventional analog techniques and systems. Sampled data techniques and digital transducers have been developed which permit digital control. The elementary component in digital control is the forward-backward counter. In many digital control systems signals are received from several different sources. If the purpose of the system is to steer the operation of the process being controlled in one of two directions, some of the signals from the different sources will indicate one direction while others will indicate a second direction. The forward-backward counter is employed to sum up the signals and record the balance in favor of one or the other of the directions.

In both fields of computation and control considerable research and development has been directed toward pure fluid systems. Pure fluid systems offer many advantages not offered by electronic or electro-mechanical systems. Notably, they are rugged, simple, inexpensive, and immune to radiation. Furthermore, fluids, in motion are widely used in military and industrial systems. For example, chemical processes, machine tools, rocket motors, and many other devices depend upon precise and timely control of moving fluids for proper operation. In such systems and applications a forward-backward counter employing pure fluid techniques could be extensively and advantageously used. One disadvantage in previously known cascaded pure fluid systems, however, has been the speed of operation of these devices. The stages of other pure fluid binary counters characteristically achieve their states by a ripple propagation of the fluid pulse to be counted through the ascending stages. The time required for this propagation increases with the number of stages. Thus, conventional pure fluid binary counters are not acceptable in applications requiring high accuracy and high speed of operation.

It is therefore an object of this invention to provide high-speed pure fluid counters and pure fluid forward-backward counters.

It is another object of the present invention to provide a pure fluid forward-backward counter having a first input for receiving fluid signals which cause the counter to count up and a second input for receiving fluid signals which cause the counter to count down.

It is still another object of the instant invention to provide a pure fluid forward-backward counter which has but a single input for receiving fluid count pulses and which may be steered to count the input pulses in either a forward or a backward direction.

According to the present invention, the foregoing and other objects are attained by providing a series of fluid pulse converters which are uniquely interconnected by a plurality of fluid logic elements which, by their control of the fluid pulse converters, permit high-speed counting in either a forward or a backward direction.

Figure 2:
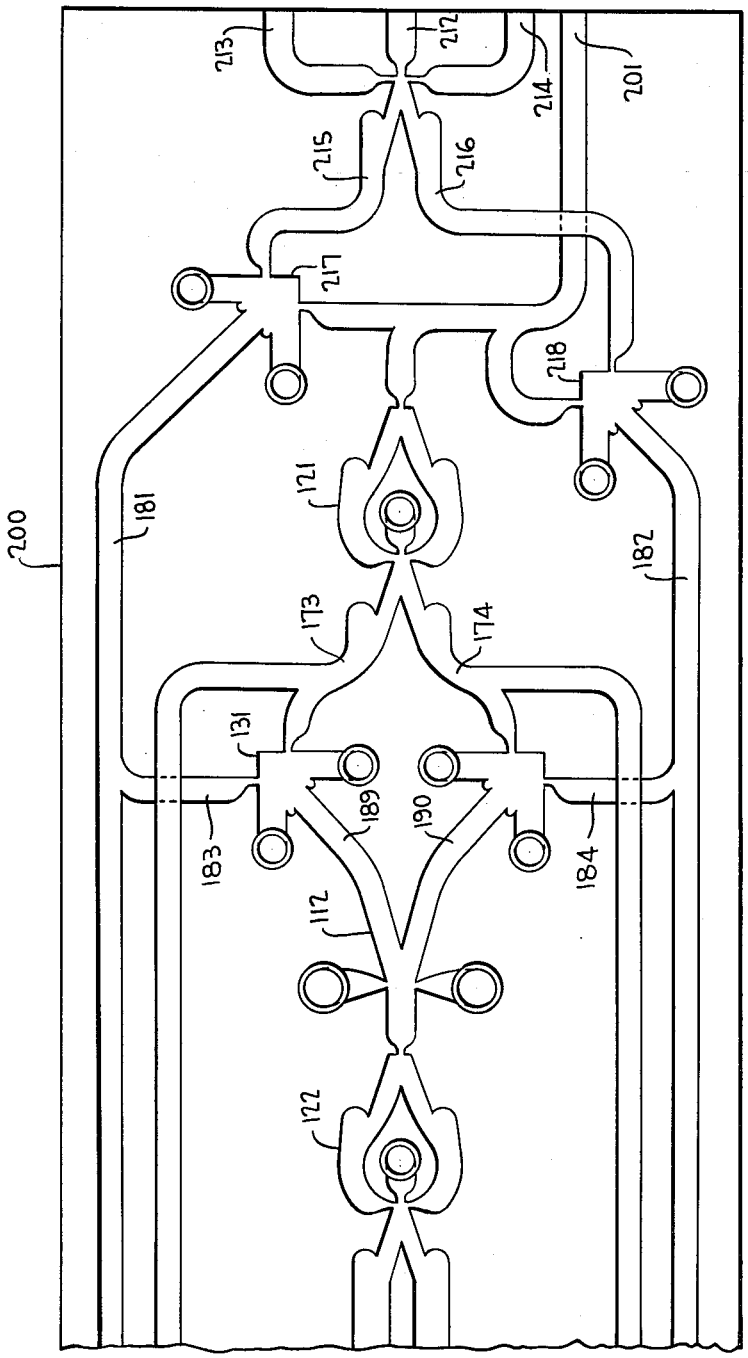

The specific nature of the invention, as well as other objects, aspects, uses and advantages thereof, will clearly appear from the following description and from the accompanying drawings, in which:

FIGS. 1A and 1B together show a plan view of a first embodiment of the invention; and FIG. 2 shows a plan view of a second embodiment of the invention.

Referring now to the drawings wherein like reference numerals designate identical or corresponding parts throughout the several figures, and more particularly to FIGS. 1A and 1B wherein a pure fluid forward-backward counter constructed in accordance with the first embodiment of the present invention is designated by the numeral 100. The counter is constructed with three basic pure fluid elements interconnected by fluid passages. These elements and passages may, for example, be conveniently fabricated as one unit by a series of plastic laminates. Optionally, the several elements may be separately fabricated and interconnected in any conventional manner. The elements of which the counter is composed are the fluid OR gates 111, 112, 113, and 114 and the fluid pulse converters 121, 122, 123, and 124 and the fluid AND gates 131 through 140, inclusive. An understanding of the fluid OR gates may be had with reference to the discussion of FIG. 2 in U.S. patent application, Serial No. 313,402, filed October 2, 1963, by R. W. Warren. A complete understanding of the fluid pulse converters may be had by reference to the discussion of FIGS. 1, 2, and 3 in the U.S. patent, No. 3,001,698, issued to R. W. Warren. Reference is also made to U.S. patent application, Serial No. 360,460, filed April 16, 1964, by D. J. Dockery which is drawn to the structure of the particular AND gates shown. The holes 150 associated with the several gates throughout the counter are fluid dumps and may physically be holes drilled perpendicular to the plane of the counter. The holes 160 associated with each of the pulse converters are for the purpose of providing a connection to a source of fluid under pressure which acts as the power stream in each of the several converters. Each pulse converter corresponds to a single stage of the counter. The counter shown in FIGS. 1A and 1B is shown as comprising four pulse converters. It is, therefore, a four stage binary counter capable of counting to 24. Obviously, greater counting capacity is obtained by merely adding on additional stages. In construction, the pulse converter 121 has its input connected to input passages 171 and 172 by OR gate 111. The first output passage 173 of pulse converter 121 is connected to one input of AND gate 131. The other input of AND gate 131 is connected by way of passages 183 and 181 to input passage 171. The second output passage 174 of pulse converter 121 is connected to one input of AND gate 132. The other input of AND gate 132 is connected by way of passages 184 and 182 to input passage 172. As is explained later the AND gates 131 and 132 serve as steering gates for the fluid backward-count pulses and fluid forward-count pulses appearing in input passages 171 and 172, respectively. The output passages 189 and 190 of AND gates 131 and 132, respectively, are connected to the input of pulse converter 122 by OR gate 112. The first output passage 175 of pulse converter 122 is connected to one input of AND gate 133. The other input of AND gate 133 is connected to the first output passage of 173 of pulse converter 121. The second output passage 176 of pulse converter 122 is connected to one input of AND gate 134. The other input of AND gate 134 is connected to the second output passage 174 of pulse converter 121. As is explained later the AND gates 133 and 134 act to sense the states of all preceding stages of the counter. The two inputs of AND gate 135 are respectively connected to the output passage 191 of AND gate 133 and to input passage 171 by way of passages 181 and 185, while the two inputs of AND gate 136 are respectively connected to the output passage 192 of AND gate 134 and to input passage 172 by way of passages 182 and 186. The AND gates 135 and 136 serve to steer the fluid backward-count and forward-count pulses, respectively, in like manner of the AND gates 131 and 132 of the preceding stage of the counter. It should be noted at this point that sensing AND gate 133 and steering AND gate 135 perform a single logical AND function; i.e., an output fluid pulse appears in passage 193 only when fluid flow exists in passages 173 and 175 and there is a count backward fluid pulse in passage 185. Thus, sensing AND gate 133 and steering AND gate 135 may be considered as a single logical AND unit. Similarly, sensing AND gate 134 and steering AND gate 136 may also be considered as a single logical AND unit. All the succeeding stages of the counter are constructed like the second stage. Thus, AND gates 137 and 138 are connected and function in a manner similar to AND gates 133 and 134, and AND gates 139 and 141 are connected and function in a manner similar to AND gates 135 and 136. It is to be noted that a count backward pulse is applied simultaneously to all the stages of the counter by way of the steering AND gates 131, 135, and 139, while a count forward pulse is applied simultaneously to all the stages of the counter by way of the steering AND gates 132, 136 and 140. This simultaneous application of the count pulses to all the stages of the counter permits the high-speed operation of the counter. Thus, each stage of the counter assumes the proper state upon application of the pulse without the time consuming ripple propagation of the count pulse through the stages.

In operation, fluid count backward pulses are received at input passage 171 while fluid count forward pulses are received at fluid input passage 172. A fluid pulse on either of fluid passages 171 or 172 is transmitted to pulse converter 121 by OR gate 111. The pulse converter 121 behaves in a manner analogous to a symmetrically triggered bi-stable multivibrator, i.e., upon receipt of an input pulse the output flow is switched between one of its two output channels. Thus, if a flow is being sustained in the passage 173 by the power stream of the pulse converter 121 at the time of the receipt of a fluid pulse, the flow would be switched from the passage 173 to the passage 174. Assume that fluid flow in passage 173 represents binary zero state for the pulse converter 121 and that fluid flow in the passages 175, 177, and 179 represent the binary zero state for each of the pulse converters 122, 123, and 124, respectively. Fluid flow in each of the passages 174, 176, 178, and 180 will, therefore, represent the binary one state for each of the pulse converters 121, 122, 123, and 124, respectively. Assume now that all of the pulse converters are in their binary zero states, i.e., fluid flow exists in the passages 173, 175, 177, and 179. A first count forward fluid pulse received at input passage 172 will cause the pulse converter 121 to switch the flow from passage 173 to passage 174 representing binary one. The fluid pulse is also transmitted to AND gate 132 by way of passages 182 and 184. The duration of the fluid pulse is short with respect to the time required for the flow in passage 173 to be switched to passage 174, the switching time of pulse converter 121 being primarily a function of the inertia of the power stream. The fluid appearing in passage 184 will, therefore, have decayed before fluid flow is switched into passage 174. Since no fluid flow exists in passage 174 at the time of the fluid pulse entering AND gate 132 by way of passage 184, there is no fluid pulse in passage 190. As a result, pulse converter 122 remains in the same state as before the fluid pulse. An examination of the succeeding stages of the counter shows that each of the remaining pulse converters does not change state for the pulse in question. For example, there is no fluid flow in passage 192 emanating from AND gate 134 because there is no fluid flow in either of passages 174 or 176. The fluid pulse is transmitted to fluid AND gate 136 by way of passages 182 and 186; however, there is no fluid flow in passage 194 because there is no fluid flow in passage 192. Therefore, the pulse converter 123 remains in the zero state. A similar analysis shows that there is no fluid flow in passages 196 and 198 and that pulse converter 124 also remains in the zero state. Thus, it may be seen that the AND gate 134 senses the states of the preceding pulse converters 121 and 122 and controls the steering AND gate 136. Similarly, the AND gate 138 senses the states of the preceding pulse converters 121, 122, and 123 and controls the steering AND gate 140. A second count forward fluid pulse received at input passage 172 causes the pulse converter 121 to switch the fluid flow in passage 174 to 173 thereby assuming the zero state. Again, the fluid pulse is transmitted to AND gate 132 by way of passages 182 and 184. This time a pulse is transmitted by way of passage 190 and OR gate 112 to pulse converter 122 because a fluid flow exists in passage 174 at the time of the second count forward fluid pulse. This causes the converter 122 to switch the flow from passage 175 to passage 176 thereby assuming the binary one state. A third count forward fluid pulse received at input passage 172 will again cause pulse converter 121 to change state from binary zero to binary one. No succeeding pulse converter will change state, however, because at the time of the third fluid pulse there was no flow in passage 174. A fourth count forward fluid pulse received at input passage 172 causes not only the pulse converter 121 to change state but also causes converters 122 and 123 to change states. Pulse converter 122 changes from the binary one state to the binary zero state due to a fluid pulse transmitted through passage 190 from the AND gate 132. Similarly, pulse converter 123 changes from the binary zero state to the binary one state because of a fluid pulse transmitted in passage 194 from AND gate 136 due to a simultaneous fluid flow in both the passages 192 and 186. To demonstrate the count backward capability of the counter, consider now a fluid pulse received on input passage 171. This causes pulse converter 121 to switch states from binary zero to binary one as before. The fluid pulse received on input passage 171, however, is transmitted to AND gate 131 by way of passages 181 and 183. Since at the time of the fluid pulse a fluid flow existed in passage 173, an output pulse from AND gate 131 is transmitted by way of passage 189 and OR gate 112 to pulse converter 122. This causes pulse converter 122 to also change states from binary zero to binary one. Since at the time of the pulse fluid flow existed in both the passages 173 and 175, fluid flow also existed in passage 191 emanating from AND gate 133. As a result, the fluid pulse transmitted by way of passages 181 and 185 to AND gate 135 causes a fluid pulse to flow in passage 193 emanating from AND gate 135. This pulse is transmitted by way of OR gate 113 to pulse converter 123. The converter 123, therefore, changes state from binary one to binary zero. It is readily seen that since no fluid flow existed in passage 177, therefore, no flow existed in either of passages 195 or 197 and pulse converter 124 remains in the binary zero state. The counter has now been made to count forward to binary zero, one, zero, zero or decimal four and backward to binary zero, zero, one, one or decimal three.

A high-speed binary counter according to the present invention is constructed like the forward-backward counter with the omission of the structure associated with the backward count mode of operation of the counter. Thus, the forward-backward counter shown in FIGS. 1A and 1B becomes a high-speed binary counter with the omission of the AND gates 131, 133, 135, 137, and 139 and their associated passages. With the omission of these AND gates, the OR gates 111, 112, 113, and 114 are not required and are also omitted. Passages 172, 190, 194 and 198 would be directly connected to the input passages of fluid pulse converters 121, 122, 123, and 124, respectively.

Referring now to FIG. 2, there is shown the first two stages of the forward-backward counter shown in FIGS. 1A and 1B modified to receive count pulses on a single input. In this embodiment designated by the numeral 200, fluid count pulses are received in input passage 201 and transmitted directly to pulse converter 121 and to one input passage of each of the AND gates 217 and 218. To cause the counter to count either forward or backward, a pure fluid binary flip-flop 211 has been provided. An understanding of the operation of the flip-flop 211 may be had by reference to the article entitled, "Wall Effect and Binary Devices," by R. W. Warren published in the Proceedings of the Fluid Amplification Symposium, volume 1, October 1962, on pages 11 to 20. Passage 212 is connected to a source of fluid under pressure which provides the power stream in the flip-flop 211. Count forward fluid command pulses are received on passage 213 which cause the power stream of flip-flop 211 to flow in passage 216 which is the second input passage of AND gate 218. Count backward fluid command pulses are received in passage 215 which cause the power stream to flow in passage 215 which is the second input passage of AND gate 217. Assume now that the counter is in the count forward mode, i.e., a flow exists in the passage 216. Further assume that the state of the counter is binary zero, one. A fluid pulse received in the count passage 201 will cause the converter 121 to change states from binary one to binary zero. Since flow existed in passage 174 at the time of the pulse, the fluid pulse is also transmitted to converter 122 by way of AND gate 218, passages 182 and 184, AND gate 132, passage 190, and OR gate 112. Pulse converter 122, therefore, changes states from binary zero to binary one. If now a count backward fluid command pulse is received on passage 214, fluid flow switches from passage 216 to 214. The next fluid count pulse received in passage 201 causes the pulse converter 121 to change states from binary zero to binary one. Since flow existed in passage 173, the fluid pulse is transmitted to pulse converter 122 by way of AND gate 217, passages 181 and 183, AND gate 131, passage 189, and OR gate 112. The pulse converter 122, therefore, changes state from binary one to binary zero. It may be seen that the counter has been made to count forward to binary one, zero or decimal two and count backward to binary zero, one or decimal one.

It should be understood, of course, that the foregoing disclosure relates to only preferred embodiments of the invention and that numerous modifications or alterations may be made therein without departing from the spirit and the scope of the invention as set forth in the appended claims.

I claim as my invention:

1. A high-speed pure fluid counter having a plurality of stages for counting a series of successive fluid pulses comprising:
   (a) a plurality of fluid pulse converters each corresponding to a stage in the counter, and having an input passage and two output passages, and
   (b) means interconnecting said plurality of fluid pulse converters and receiving said fluid pulses to be counted, said means sensing the state of all lower order fluid pulse converters and appropriately and simultaneously causing the ascending orders of fluid pulse converters to change state or not upon receiving a fluid pulse.

2. A high-speed pure fluid counter as defined in claim 1 wherein said means includes a plurality of fluid gates which perform the logical AND function corresponding in number to one less than the number of fluid pulse converters, each of said gates having a plurality of input passages and one output passage, one of said two output passages of each preceding fluid pulse converter being connected to an input passage of each of said fluid gates, each of said fluid gates having input passage connected to receive said fluid pulses, and the output passage of each fluid gate being connected to the input passage of the corresponding fluid pulse converter.

3. A high-speed pure fluid forward-backward counter having a plurality of stages for counting up a first series of successive fluid pulses and for coutning down a second series of successive fluid pulses and to provide an output which is equal to the difference between said first series of fluid pulses and said second series of fluid pulses comprising:
   (a) a plurality of fluid pulse converters each corresponding to a stage in the counter and having an input passage and two output passages, the input passage of the fluid pulse converter corresponding to the first stage of the counter being connected to receive each fluid pulse of both said first and said second series, and
   (b) means interconnecting said plurality of fluid pulse converters and receiving said first and second series of fluid pulses to be counted, said means sensing the state of all lower order fluid pulse converters and appropriately and simultaneously causing the ascending orders of fluid pulse converters to change state or not upon receiving a fluid pulse of either said first or second series depending upon whether a fluid pulse of said first series of fluid pulses exists or a fluid pulse of said second series of fluid pulses exists.

4. A high-speed pure fluid forward-backward counter as defined in claim 3 wherein said means includes:
   (a) a first plurality of fluid gates which perform the logical AND function corresponding in number to one less than the number of fluid pulse converters, each of said fluid gates having a plurality of input passages and one output passage, one of said two output passages of each preceding fluid pulse converter being connected to an input passage of each of said fluid gates of said first plurality, each of said fluid gates of said first plurality having one input passage connected to receive the fluid pulses of said first series,
   (b) a second plurality of fluid gates which perform the logical AND function corresponding in number to one less than the number of fluid pulse converters, each of said fluid gates having a plurality of input passages and one output passage, the other of said two output passages of each preceding fluid pulse converter being connected to an input passage of each of said gates of said second plurality, each of said fluid gates of said second plurality having one input passage connected to receive the fluid pulses of said second series, and
   (c) means for connecting the output passages of corresponding fluid AND gates of said first plurality and said second plurality to the input passage of the next succeeding fluid pulse converter.

References Cited by the Examiner

UNITED STATES PATENTS 3,001,698  9/1961  Warren _____ 235—201
3,107,850  10/1963  Warren et al. _____ 235—201

OTHER REFERENCES

Gray et al.: "Fluid Amplifiers," Control Engineering, pp. 57–64, February 1964.

Mitchell: "Fluid Binary Counter," IBM Technical Disclosure Bulletin, vol. 6, No. 2, July 1963, page 30.

Shinn: "No Moving Parts Needed," SAE Journal, August 1963, pp. 38–43.

Wood et al.: "Fluid Computers," International Science and Technology, November 1963, pp. 44–52.

LEO SMILOW, *Primary Examiner.*

W. F. BAUER, *Assistant Examiner.*